June 20, 1939.   F. A. KING   2,162,726

FISHING REEL

Filed Oct. 25, 1935

Inventor:
F. A. King

Patented June 20, 1939

2,162,726

UNITED STATES PATENT OFFICE 2,162,726

FISHING REEL

Frank A. King, Los Angeles, Calif.

Application October 25, 1935, Serial No. 46,747

22 Claims. (Cl. 242—84.5)

This invention appertains to combined drag and free spool fishing reels and more particularly to a type of fish line reel, including a reel shaft which carries a frictional spool engaging element or device over which a hollow spool is free to rotate, while not engaged therewith; yet capable of driving the spool and/or yieldably restraining free rotation thereof.

Heretofore in fishing reel construction of the above character it has been the practice to provide the spool driving means with a drag mechanism and separate independent disengaging gears or shiftable clutch members for free spool action. Obviously such disengaging gears or clutch members are subject to being stripped while being engaged, as in the event of an instant catch, immediately following the casting of the line.

It is therefore an object of this invention to provide the spool driving means and the drag adjusting mechanism, with separate coacting, constantly engaged gear trains, both operated by a geared handle carried by the crank arm. The handle is adapted under manual action to fully release the spool from the drag mechanism and all rotating members thereof, thus permitting efficient free spool action, for casting the line if desired.

A further object of this invention is the novel construction of a pivoted roller bearing assembly including a drum and a gear train, which is adapted to drive the spool shaft in a given direction. The drum is associated with an adjustable friction band, which is adapted to yieldably restain retroactive movement of the spool shaft and also serve as a safety means to prevent snapping of the line.

Another important object of this invention is to provide the crank arm with a drag adjusting mechanism, which includes an independent gear train having screw engagement with the spool shaft and gear engagement with the crank arm handle. The latter gear train and the driving gear train being of equal ratio so as to permit neutral cranking position of the handle.

Reference will now be had to my copending application Ser. No. 29,249 filed July 1, 1935, now Patent No. 2,054,823, dated September 22, 1936, wherein a similar coacting gear ratio is described.

Other objects and novel features of the invention, not specifically referred to above will appear more fully hereinafter from the following detail description, when taken in connection with the accompanying drawing, wherein there is illustrated a preferred embodiment of the invention. It is to be expressly understood, however, that the drawing is for the purpose of illustration only and is not designated as a definition of the invention, reference being had for this purpose to the appended claims.

In the drawing, wherein similar reference characters refer to similar parts through the several views.

Figures 1, 2, 3, 4, 5, 6:
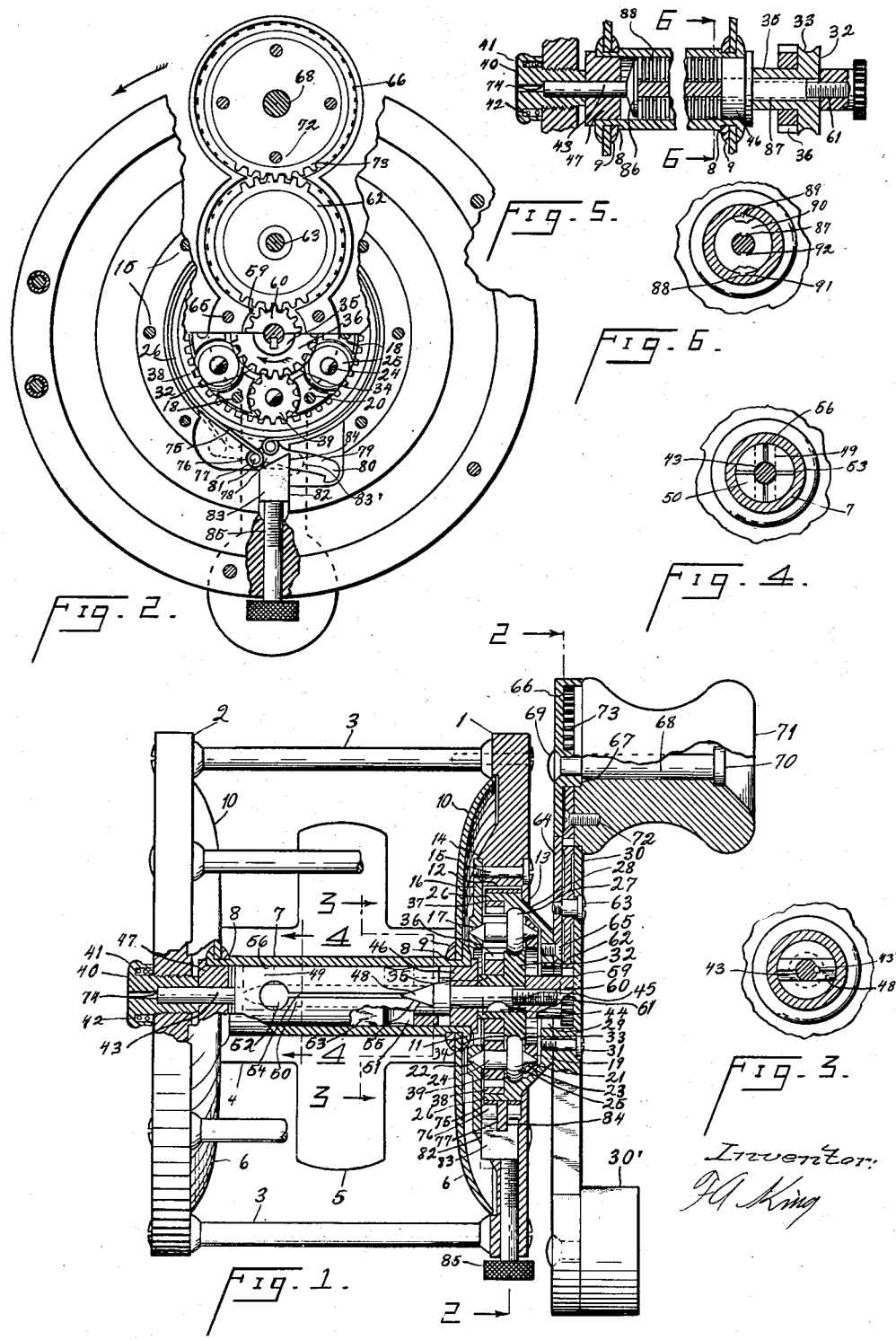
Fig. 1 is a longitudinal sectional view of the invention, certain parts being shown in elevation.
Fig. 2 is a section thereof through the line 2—2 of Fig. 1.

Figs. 3 and 4 are transverse sectional views of the drag mechanism taken on lines 3—3 and 4—4 respectively of Fig. 1;

Fig. 5 is a modified form of drag mechanism and Fig. 6 is a cross section thereof on line 6—6 of Fig. 5.

The reel embodies two end plates comprising a front plate 1 and a back plate 2 fabricated of any suitable material and connected by pillars 3 and a foot plate 4, which foot plate is formed with an integral reel seat 5 by which the reel is attached to the rod. The plates and connected parts constitute the reel frame wherein is rotatably supported a line receiving spool 6.

The spool in the present reel is of special form comprising a tubular hub member 7, which is provided with reduced ends thus forming annular shoulders 8—8 against which are seated cove faced washers 9—9 and abutting the washers are seated convex end flanges 10—10. Each flange 10—10 is secured in position after assembly on said reduced ends by peening or beading over the metal against the outer or concave face of the flanges as indicated at 11.

The mechanism which constitutes the pivoted multiple roller bearing assembly of this invention is more particularly characterized as follows:

The front plate 1 is provided with an annular concentric opening 12, having an inwardly projecting flange 13 at the outer margin thereof, and the plate is also provided with an annular recess 14, on the inner face thereof. Secured in the recess 14 by screws 15 is an annulus plate 16 and adjacent its inner periphery on the outer face thereof is provided a circular row of cone shaped sockets 17. Facing the latter and secured thereto by screws 18 is a complementary annulus 19 on the inner face of which is machined an annular row of segmental shaped lugs 22, as shown in Fig. 2 which project inwardly in a parallel plane with respect thereto and abut the face of plate 16, thus forming a roller bearing retaining cage.

The inner face of annulus 19 is provided with a complementary row of cone shaped sockets 21, which are alternately interposed between the segmental lugs 20. The two rows of cone sockets 17 and 21 are spaced apart and rotatably receive pivotal cones or trunnions 22 and 23 respectively of spindles 24, which are formed integral on roller bearings 25. In this instance the peripheries of the roller bearings 25 are convex in form with respect to the longitudinal cross section thereof.

Mounted over bearings 25 is a friction drum 26 provided with an annular internal groove concave in cross section, thus forming a raceway 27, which is seated upon the outer multiple contact circle formed by the assembly of bearings 25. Such drum is formed with a cone shaped housing 28, which encircles the annulus 19 and projects outwardly through opening 12 and terminating in an inwardly extending flange or face 29. The operating crank arm 30 is provided with the usual extending counter-weight 30' and is securely attached against the face 29 by means of apertures and screws 31, having threaded engagement therewith, whereby rotation of the crank arm 30 will effect rotation of the drum 26.

A spool shaft driving roller 32 is formed with a concave peripheral raceway 33 which is concentrically seated in the internal convex multiple contact circle 34 formed by multiple rollers 25. This roller 32 has an inwardly projecting apertured hub 35 over which a gear 36 is united by press fit or other suitable means, whereby the gear 36 and roller 32 are rotatable in unison.

The drum 26 is provided with an annular internal recess 37, wherein is secured by press fit or other suitable means an internal ring gear 38 whereby the drum 26 and gear 38 are revoluble in unison, and mounted on three of the spindles 24 are spur gears 39 which mesh with said ring gear 38 and also with the gear 36 on the roller 32.

The multiple rollers 25, spur gears 39 and their respective cone trunnions are rotatable in their respective stationary sockets 17 and 21. It will now be understood that rotation of the operating crank arm 30 will impart rotation to gear 36 in a direction opposite to that of the crank arm 30 since rotation of crank arm 30 turns housing 28, drum 26, and the internal ring gear 38 in unison with the crank arm and rotation of the ring gear acts through the spur gears 39 to drive the gear 36 in a direction of travel reverse to that of the ring gear 38.

It will also be understood that the pitch diameter of each gear 26 and 38 and equal to the diameter of its accompanying roller and raceway and since due to gears 39 being carried by spindles 24 the rollers and the gears coact in their relative rotational movement, thus providing a fixed ratio antifriction roller bearing driving mechanism, for driving the drag mechanism, which is also of novel construction and which will now be described.

The black plate 2 is centrally drilled and threaded to form an opening wherein is screwed a longitudinally adjustable bushing 40, formed with a cup shaped head 41 which covers a detention spring 42 retaining the bushing in its longitudinally adjusted position, and other functions which will later be described.

Extending axially through the reel frame is a journaled spool shaft 43, one end of which is journaled in bushing 40 and at its opposite end is keyed by key 44 in the apertured hub 35 which is provided with an elongated keyway 45 and adapted to permit longitudinal movement of the shaft.

The spool hub 7 is provided with a flanged bushing 46 abutting the inner end of hub 35, and abutting the inner end of bushing 40 is a complementary bushing 47. In this instance the bushings 46 and 47 are secured in the ends of hub 7 by press fit, thus forming a hollow spool assembly, which is journaled on the shaft for free spool action irrespective of rotation and longitudinal movement of shaft 43.

Abutting the bushing 46 is an apertured V-shaped cross wedge 48 through which shaft 43 is free to shift longitudinally; the wedge being rotatable with shaft 43 by means of key 43'. Adjacent the bushing 47 is a complementary cross wedge formed integral with the shaft, as indicated by dotted lines 49. The apices of the two wedges are spaced apart and transversely disposed with respect to their axis but face each other. Interposed between wedges 48 and 49 is a cylindrical drag element or mechanism 50, which is fabricated of any suitable frictional material.

The element 50 is formed with a central bore as shown in Fig. 4 through which the shaft is free to shift longitudinally. Adjacent the ends of element 50 are provided transverse apertures 51 and 52 whose adjacent walls are provided with slots 53 and 54 extending longitudinally of the element 50 to opposite ends thereof, at which location the slots are bevel faced, thus forming seats 55 and 56 which engage the wedges 48 and 49 respectively.

Obviously longitudinal movement of shaft 43 and its integral wedge 49 toward wedge 48 will serve to expand the drag element 50 against the internal cylindrical surface of hub 7, whereas a reverse movement of the shaft will permit contraction of the drag element due to its tendency to seek its original form as an integral member.

The back side of arm 30 is provided with a recess 59 in which is mounted an internally threaded adjusting gear 60 having threaded engagement with the threaded end 61 of the shaft 43. Gear 60 is restrained against longitudinal movement by being interposed between the back wall of recess 59 and roller 32.

In this instance recess 59 receives a spur idler gear 62 which is rotatably retained in position by means of a shouldered screw 63 threaded through a cover plate 64, which is attached to flange 29 by screw 65 and inserted in recess 59.

Adjacent the end and on the front face of arm 30 is provided a circular recess 66, at the center of which is located an apertured boss 67, which supports a crank pin 68 by means of head 69 thereon. Rotatably secured on pin 68 by head 70 is a cranking handle 71 which carries with it by means of screws 72 a gear 73. Recess 66 intersects recess 59, therefore gear 73 is permitted to engage idler gear 62, which in turn is in mesh with the adjusting gear 60, thus forming a gear train engagement between the latter and the cranking handle 71.

Obviously rotation of handle 71 with respect to the crank arm will effect longitudinal movement of shaft 43 through the medium of the train of gears 73, 62 and 60 by reason of the threaded end 61 of shaft 43 engaging with the gear 60. Such longitudinal movement functions to engage or disengage the shaft and the spool assembly as before described.

Bushing 40 is provided with a reduced bore thus providing a stop shoulder 74 for the end of shaft 43 when it is shifted to its extreme drag released position as shown in Fig. 1. It will be observed, however, that there is provided ample space at the threaded end 61 for shifting the shaft through its bearings to its fully engaged position.

The adjusting gear train operates in a simple manner, only when adjustments are to be made and in this instance at three to one ratio, to drive the screw adjusting gear 60; but as the handle is firmly gripped by the operator's hand and the gear train is swung about the crank arm axis in an epicyclical manner it serves to drive the adjusting gear 60 at a two to one ratio and in a reverse direction to that of the crank arm.

The shaft driving gear train is also of two to one ratio, therefor the two gear trains coact while driving the shaft assembly. Gear 60 is screwed against the face of roller 32 on the shaft and the drag fully engaged with the spool. These parts are then united as a unitary body, as when reeling in the line.

The frictional connection between the two gear trains merely tends to maintain the handle in a neutral cranking position with respect to the reel frame and the operator's hand grip, thus the handle may be instantly and accurately adjusted at the will of the operator.

Encircling the drum 26 is a contracting friction band 75, whose ends are curved thus forming eyes 76 which are bifurcated at 77, to receive the apertured end 78 of lever 79 having a hook 80 at the opposite end thereof. Fulcrum pins 81 are inserted through eyes 76 and the apertured end 78, thus permitting the lever 79 to swing radially outward, as a result of tension in the band 75.

On the back side of plate 1 is provided an elongated square shaped recess 82, wherein is located a corresponding shaped block 83, having beveled end which is transversely bifurcated at 84 to fit over lever 79 thus serving to retain block 83 in position.

Plate 1 is drilled and threaded to receive a knurled adjusting screw 85 which extends from the squared end of block 83 out through the periphery of the plate, thus providing external means for longitudinal adjustment of block 83.

It will be observed that rotation of drum 26 and the driving mechanism is permitted in a given direction, as indicated by the arrows shown in Fig. 2. But reverse movement of such mechanism is restrained, since due to a slight frictional tendency of band 75 to cling to drum 26 the lever 79 is drawn downwardly, passing through bifurcated end 84, which serves to swing the lever inwardly, by means of fulcrum pin 81 and its tangential position with respect to the drum 26, thus contracting band 75 on its drum. Such movement is limited by the hook 80 striking the block 83 as indicated by dotted lines 83', and the friction of the band is also limited according to the adjusted position of the screw 85 and its block, thus serving to restrain or yieldably restrain retroactive movement of the driving mechanism.

In the modified form of clutch or drag device disclosed in Figs. 5 and 6 the shaft 43 is formed with an integral flange 86. Intermediate the latter and threaded end 61 thereof the shaft 43 is splined or grooved as indicated by dotted lines 87. The internal periphery of hub 7 is also provided with grooves 88.

Alternately interposed between bushing 46 and integral flange 86 is located a series of apertured male and female multiple disks 89 and 90 respectively. The male disks 89 are formed with diametrical lugs 91, which are shiftable in the grooves 88 and the female disks 90 are provided with internal lugs 92 which are shiftable in the grooves 87.

The aperture of hub 35 is provided with internal splines or lugs corresponding to grooves 87 which serve to form a driving connection therebetween; yet permit longitudinal shaft movement.

It will now be understood that longitudinal movement of the shaft and its integral flange toward bushing 46 will compact the multiple disks therebetween, thus providing frictional engaging and disengaging means between the shaft and its spool assembly which is operated by the screw adjusting gear 60 in the manner before described.

The operation of the invention is as follows:

The frictional tension of the retroactive means is adjusted by means of the screw 85 of a tension value slightly under the tensile strength of the line.

The drag friction is fully released by manual rotation of the handle relative to the crank arm and the line is paid out by casting if desired. In the event of an instant catch and at which time the line is rapidly carried out by the pull of the fish, the friction resistance of the drag may be increased by reverse movement of the handle to a value exceeding that of the retroactive means which will be noted by such movement, thus the drag tension is then gauged and regulated in accordance to such retroactive movement.

When it is desired to wind the line on the spool the drag element is placed in condition to effect tight engagement between the spool and shaft by turning the handle 70 to actuate the drag through the gear train on the crank, whereupon the crank is rotated in its forward winding direction to effect rotation of the drag element through the gears train in the reel frame.

When the drag is in engagement with the spool the crank will be held against free retrograde rotation by frictional engagement of the band 75 with the drum 26 to an extent determined by the adjustment of the band by the screw 85, thus preventing spinning of the crank in event grip on the handle is broken.

In event it is desired to free the spool or permit it to rotate in the unwinding direction under resistance the handle is turned on the crank to release or partly release the drag element from engagement with the spool.

Of course it will be understood that changes may be made in the size, shape and number of the pivoted rollers as well as the ratio of the gearing.

While there has been shown and described a preferred embodiment of the present invention, it will be understood that the same is not limited thereto but is capable of being embodied in variously mechanical forms. Thus drag elements other than that shown might be employed or other changes occurring to one skilled in the art might be made without departing from the spirit and scope of the invention. Reference will therefore be had to the appending claims for a definition of the limits of the invention.

What I claim is:

1. In a fishing reel, a frame, a spool, a drag element carried interiorly of said frame and engageable with said spool, means for driving said spool including a crank, a turnable handle on said crank, and means connected with said handle and operable by the rotation thereof for placing said drag element in and out of operative connection with said spool.

2. In a fishing reel, a frame, a spool, a drag element engageable with said spool, a crank on said frame, means including gearing for driving said element from said crank, a turnable handle on said crank, and means connecting with said handle and operable by the rotation thereof for placing said drag element in and out of operative connection with said spool.

3. In a fishing reel, a frame, a spool carried by said frame, a shaft carried by said frame extending into said spool, a drag element interposed between said shaft and spool, a crank on said frame, means for driving said spool from said crank, a turnable handle on said crank, and means connecting with said handle and operable by the rotation thereof for placing said drag element in and out of operative connection with said spool.

4. In a fishing reel, a spool, a drag element engagable with said spool, a gear on said element, pinion gears rotatably mounted on said frame and in mesh with the gear on said element, an internal gear rotatably carried by said frame and in mesh with said pinion gears, a crank on said internal gear, a turnable handle on said crank, and means connecting with said handle and operable by the rotation thereof for engaging and disengaging said drag element with said spool.

5. In a fishing reel, a spool, a drag element engagable with said spool, a drive gear and an adjusting gear on said element, pinion gears rotatably mounted on said frame and in mesh with said drive gear, an internal gear rotatably carried by said frame and in mesh with said pinion gears, a crank on said internal gear, a geared handle on said crank, and gear connections intermediate said adjusting gear and said handle for engaging and disengaging said element with said spool through said adjusting gear.

6. In a fishing reel, a frame, a shaft carried by said frame, a free spool journalled on said shaft, a drag element interposed between said shaft and spool, a crank on said frame, gear connections between said crank and shaft for revolving the latter, a turnable handle on said crank, and means connecting with said handle and operable by the rotation thereof for placing said drag element in and out of operative connection between said shaft and spool.

7. In a fishing reel, a frame, a longitudinal movable and revoluble shaft carried by said frame, a free spool journalled on said shaft, a drag element interposed between said shaft and spool, means for placing said element in and out of frictional engagement with said spool by reciprocating said shaft, a crank carried on said frame, gears connecting said crank and shaft, a turnable handle on said crank, and means connecting said handle and shaft for reciprocating said shaft on turning the handle.

8. In a fishing reel, a frame, a shaft carried by said frame for longitudinal and revoluble movement, a free spool carried by said frame having a hub into which said shaft extends, a crank carried on said frame, gear connections between said crank and shaft, a drag element between said hub and shaft, a turnable handle on said crank, means on said shaft for actuating said drag element on longitudinal movement of said shaft, a turnable handle on said crank, and means carried by said crank connecting said handle with said shaft for reciprocating the latter on turning the handle relative to the crank.

9. A fishing reel comprising a frame, a hollow spool adapted for frictional engagement, a shaft including a friction element over which the spool is free to rotate, driving means rotatably supported by the frame including a gear train, a crank arm and a handle thereon, a friction operating mechanism intermediate said spool and said handle including a second gear train and said driving means, said friction operated means coacting with said driving means for driving said spool and adjusting the friction of said element.

10. A fishing reel comprising a frame, a hollow spool adapted for frictional engagement, a rotatable expanding friction drag element including a shaft on which the spool is free to rotate, a threaded end on the shaft and a threaded coacting gear carried thereby, means comprising antifriction bearings, a gear train cooperating with the bearings and including a crank arm for driving said drag element, a gear train in mesh with said coacting gear and including a handle carried by the crank arm for driving said drag element and expanding and retracting said element.

11. A fishing reel comprising a frame, a hollow spool adapted for frictional engagement, a rotatable friction drag element including a shaft on which the spool is free to rotate with respect thereto, a threaded end on the shaft and a coacting gear carried thereby, means comprising antifriction bearings having a fixed ratio and including a crank arm for driving said drag element, a gear train in mesh with said threaded gear and including a handle carried by the said arm for driving said drag element and adjusting the friction thereof.

12. A fishing reel comprising a frame, a hollow spool adapted for frictional engagement, a rotatable friction drag element including a shaft on which the spool is free to rotate with respect thereto, a threaded end on the shaft including a coacting gear, the shaft adapted for longitudinal movement, means comprising a relatively stationary retainer including antifriction bearings, an inner and outer race rotatable on the bearings, means to restrain the outer rotatable race against rotation, a crank arm carried by the outer race, means for driving the inner race and said shaft from said outer race, the bearings having a fixed ratio relative to said shaft, a gear train in mesh with said coacting gear and including a handle carried by the crank arm for driving said friction drag element and adjusting the friction thereof.

13. A fishing reel comprising a frame, a spool adapted for frictional engagement, a rotatable frictional drag element including a shaft on which the spool is free to rotate, a threaded end on the shaft including a gear, the shaft adapted for longitudinal movement, means comprising a fixed retainer and radial bearings rotatable thereon, inner and outer races rotatable on said bearings, means to restrain the outer rotatable race against rotation, means including intermeshing teeth for maintaining a fixed ratio among said bearings and races, the outer race including a crank arm for driving the inner race and the shaft, a handle on said arm including a gear, a gear carried by said arm and engaged with the gear on the shaft and the gear on the handle, the ratio of the latter gears being equal to said fixed ratio so as to permit neutral cranking position of said handle.

14. A fishing reel comprising a frame, a hollow spool, a threaded shaft including a frictional mechanism over which the hollow spool is journaled for frictional engagement and free rotation thereof, means rotatably supported upon the frame including a circle of pivoted roller bearings and an inner and outer race rotatable thereon and therein respectively, means to restrain the outer rotatable race against rotation, means including intermeshing teeth for maintaining a fixed ratio among the roller bearings and races, the outer race including a crank arm and a handle thereon for driving the inner race and the shaft, gearing carried by the cank arm having screw engagement with said threaded shaft and gear engagement with the handle for adjusting the frictional mechanism, the handle coacting with said fixed ratio, whereby to permit neutral cranking position thereof.

15. A fishing reel comprising a frame, a hollow spool adapted for frictional engagement, a normally rotatable expanding drag element including a longitudinally movable shaft over which said spool is free to rotate with respect thereto, a threaded end on the shaft, means comprising antifriction bearings having a relatively fixed ratio and including a crank arm for driving said drag element, a gear train including a handle and an idler gear carried by said arm, the train being threadedly engaged with said threaded end for expanding said drag element, on longitudinal movement of said shaft and of a ratio adapted to coact with said fixed ratio, whereby to actuate neutral cranking position of said handle through the medium of said drag element.

16. A fishing reel comprising a frame, a spool adapted for frictional engagement, a normally rotatable expanding drag element including a longitudinally movable shaft on which the spool is free to rotate, a threaded end on the shaft, means comprising a fixed retainer including pivoted anti-friction bearings, an inner and an outer race, means to restrain the outer rotatable race against rotation, a crank arm on the outer race for driving the inner race and said element, means comprising intermeshing gear teeth for maintaining a fixed ratio among the anti-friction bearings and the inner and outer races, a gear train including a handle carried by said arm, the train being threadedly engaged with said threaded end for expanding said drag element on longitudinal movement of said shaft and of a ratio adapted to coact with said fixed ratio whereby to actuate neutral cranking position of said handle through the medium of said drag element.

17. In a fishing reel, a spool, a shaft around which the spool is freely revoluble, means for supporting said shaft, said shaft being movable longitudinally in its supporting means relative to said spool, a crank revolubly mounted on said shaft supporting means, driving connections between said crank and shaft for effecting rotation of the shaft on rotation of the crank, a turnable handle on said crank, a gear having screw threaded engagement with said shaft, gear connections between said handle and said gear for rotating the latter to effect longitudinal movement of said shaft, and means interposed between said shaft and spool for interengaging said shaft and spool on longitudinal movement of the shaft in one direction and to free the spool of the shaft on longitudinal movement of the latter in the other direction.

18. In a fishing reel, a spool provided with multiple disks, a drag element including multiple disks engageable with said first mentioned disks, a gear on said element, pinion gears rotatably mounted on said frame and in mesh with the gear on said element, an internal gear rotatably carried by said frame and in mesh with said pinion gears, a crank on said internal gear, a turnable handle on said crank and means connecting with said handle for engaging and disengaging said disks on turning said handle.

19. In a fishing reel, a spool, a drag element engageable with said spool, a drive gear and an adjusting gear on said element, pinion gears rotatably mounted on said frame and in mesh with said drive gear, an internal gear rotatably carried by said frame and in mesh with said pinion gears, means including a friction band and a pivoted lever thereon associated with said internal gear and said frame for restraining movement of said internal gear in a given direction, a crank on said internal gear, a geared handle on said crank and gear connections intermediate said adjusting gear and said handle for engaging and disengaging said element with said spool through said adjusting gear.

20. In a fishing reel, a frame, a spool, a drag element carried by said frame and engageable with said spool, means carried by said frame including a crank for driving said element, an adjusting gear on said element, a geared handle on said crank, a gear connection intermediate said adjusting gear and said handle for engaging and disengaging said element with said spool through said adjusting gear.

21. In a fishing reel, a frame, a spool, a drag element carried by said frame and engageable with said spool, means carried by said frame including a crank for driving said element and means carried by said frame for restraining retroactive movement of said crank, an adjusting gear on said element, a geared handle on said crank, and gear connections intermediate said adjusting gear and said handle for engaging and disengaging said element with said spool through said adjusting gear.

22. In a fishing reel, a frame, a spool, a drag element concentrically carried by said frame and engageable with said spool, an adjusting gear on said element, means concentrically carried by said frame including a crank for driving said element in reverse direction to said crank, a handle on said crank, and means carried by said frame for restraining retroactive movement of said crank; gear connections intermediate said adjusting gear and said handle for engaging and disengaging said element with said spool through said adjusting gear.

FRANK A. KING.